United States Patent [19]
Estelle

[11] Patent Number: 5,270,861
[45] Date of Patent: Dec. 14, 1993

[54] ZOOM LENS SYSTEM FOR USE IN A COMPACT CAMERA

[75] Inventor: Lee R. Estelle, Rochester, N.Y.

[73] Assignee: Eastman Kodak Company, Rochester, N.Y.

[21] Appl. No.: 807,521

[22] Filed: Dec. 13, 1991

[51] Int. Cl.⁵ .............................................. G02B 15/14
[52] U.S. Cl. ............................ 359/676; 359/683; 359/692; 359/740
[58] Field of Search ............... 359/676, 680, 683–684, 359/689–692, 694, 739, 740

[56] References Cited

U.S. PATENT DOCUMENTS

| | | | |
|---|---|---|---|
| 4,720,179 | 1/1988 | Ito | 350/676 |
| 4,787,718 | 11/1988 | Cho | 350/683 |
| 4,815,830 | 3/1989 | Sato et al. | 350/683 |
| 4,830,476 | 5/1989 | Aoki | 350/683 |
| 4,836,660 | 6/1989 | Ito | 350/676 |
| 4,854,683 | 8/1989 | Ozawa | 350/683 |
| 4,889,416 | 12/1989 | Yamada | 350/680 |
| 4,936,661 | 6/1990 | Betensky et al. | 350/676 |
| 4,953,957 | 9/1990 | Kobayashi | 350/676 |
| 4,993,814 | 2/1991 | Hata | 350/680 |
| 5,000,549 | 3/1991 | Yamazaki | 359/676 |
| 5,071,235 | 12/1991 | Mori et al. | 359/692 |
| 5,087,988 | 2/1992 | Nakayama | 359/689 |
| 5,153,777 | 10/1992 | Okada et al. | 359/692 |

FOREIGN PATENT DOCUMENTS 3-150518  6/1991  Japan .

Primary Examiner—Bruce Y. Arnold
Assistant Examiner—James Phan
Attorney, Agent, or Firm—Leonard W. Treash, Jr.

[57] ABSTRACT

A zoom lens system including a first lens unit of positive power and a second lens unit of negative power with the axial separation therebetween varies to bring about zooming. The first lens unit includes at least one positive lens element and at least one negative lens element and the second lens unit consists of a biconcave negative lens element having a strong curvature towards the front.

5 Claims, 2 Drawing Sheets

ZOOM LENS SYSTEM FOR USE IN A COMPACT CAMERA

BACKGROUND OF THE INVENTION

Related Application

This application is related to co-assigned U.S. patent application Ser. No. 07/807,541, filed Dec. 13, 1991, entitled A COMPACT ZOOM LENS HAVING A WEAK FRONT LENS GROUP, in the name of Lee R. Estelle.

FIELD OF THE INVENTION

This invention relates to zoom lenses that while they may be used in general applications are particularly suitable for use in compact photographic devices.

BACKGROUND ART

Following the recent trend in the art to reduce camera bulk and size, there has been an increasing demand in shortening the camera length in the longitudinal direction.

In the prior art, cameras with so-called short zoom lenses are known to be comprised of a front negative optical unit and a rear positive optical unit. Despite the small size of these systems, these systems have a serious drawback; namely a long back focal length. Even though the lens system itself may be short, a camera embodying the lens is inevitably necessarily bulky because of this long back focal length. In order to overcome this problem, improved zoom lenses have been proposed.

These improved zoom lenses are comprised of two optical units. In order from the object side, these zoom lenses include an optical unit of positive power and an optical unit of negative power. However, the designs of this type typically have a large number of lens elements. This makes it difficult to construct a compact zoom lens. U.S. Pat. No. 4,815,830 teaches that a zoom lens of this type may have a relatively small number of elements if the rear, negative optical unit consists of a negative meniscus lens element.

U.S. Pat. No. 4,936,661 issued to Ellis I. Betensky et al. on Jun. 26, 1990 described a zoom lens with a short back focal length and having, from front to rear, a positive optical unit and a negative optical unit. The positive optical unit consists of a negative front subunit and a positive rear subunit.

SUMMARY OF THE INVENTION

It is an object of the present invention to provide a lens system which has a small number of lens elements and which is relatively simple while retaining a small size for the lens itself and for the camera.

According to the present invention, a small size zoom lens comprises: a first lens unit of positive refractive power including a front, subunit having weak refractive power; a second positive power subunit, the second subunit includes at least one lens element having positive refractive power; and an aperture stop located between said front and second subunit. The second lens unit is arranged on the image side of said first lens unit, and consists of a negative refractive power biconcave lens element. Zooming function is performed by varying the axial separation between said first lens unit and said second lens unit.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
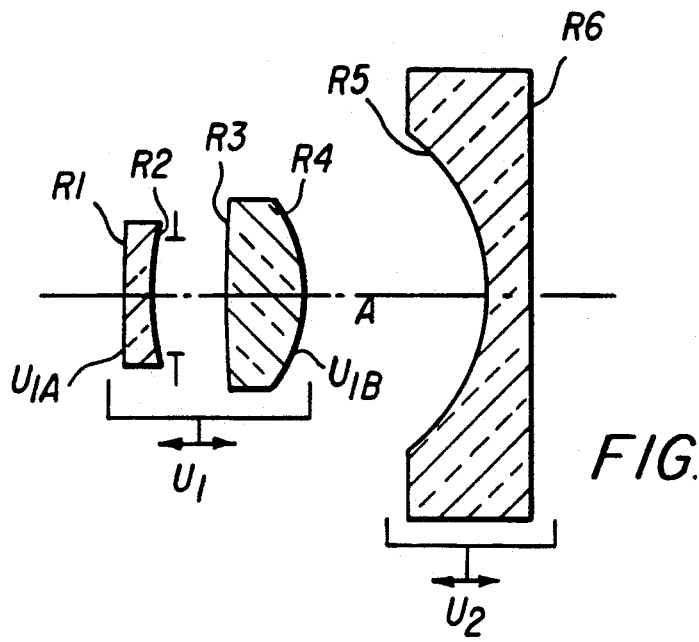
FIGS. 1-4 are simplified schematic cross-sectional views of a zoom lens constructed according to four embodiments of the present invention.
Figure 2:
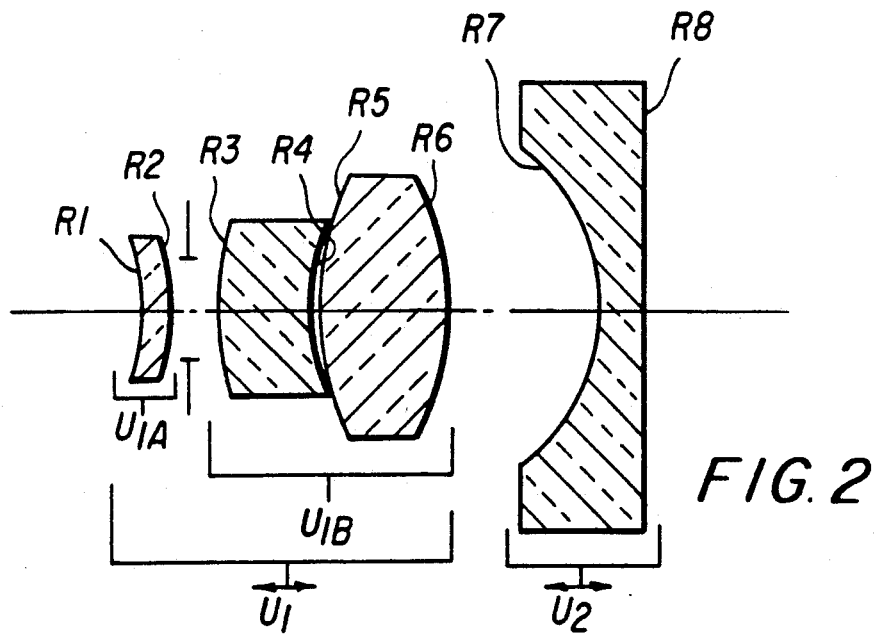
Figure 3:
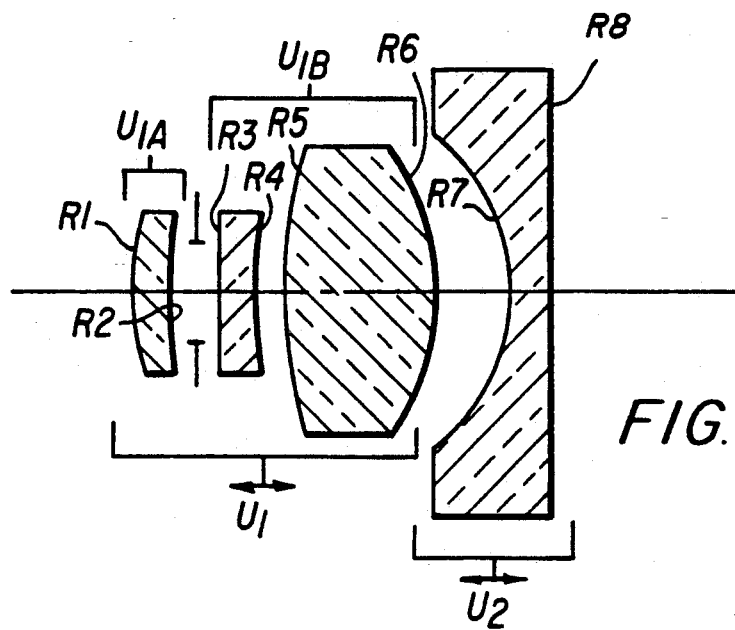
Figure 4:
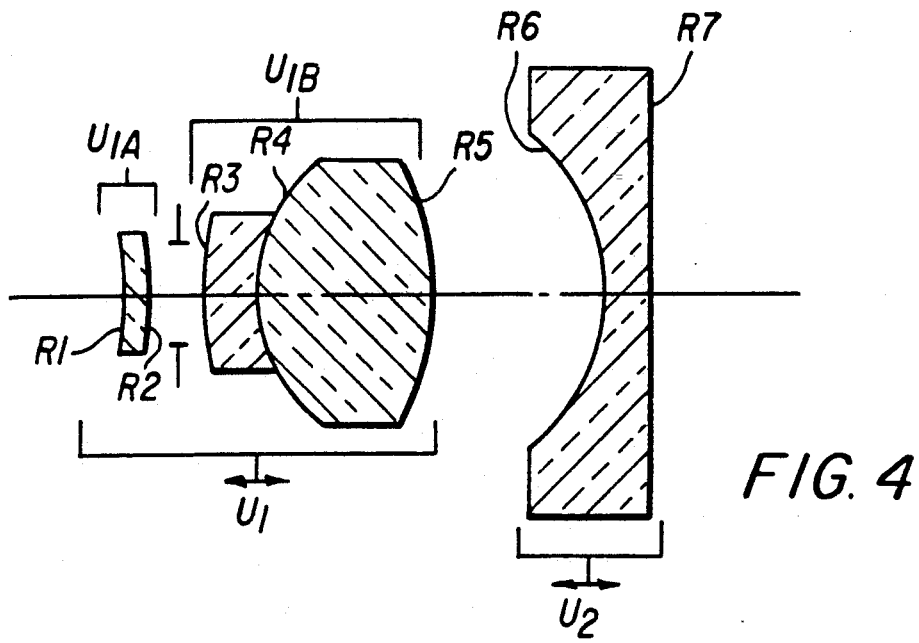

The embodiments of the invention are illustrated by a series of examples set forth in Tables 1-4 and corresponding FIGS. 1-4. In the tables and in the drawings the surfaces R are numbered by subscripts from the front or object side of the lens to the rear or image side of the lens. In the tables, radii and thicknesses are listed on the same line as the surface preceding the radii or thickness or spacing as the case may be. All indexes $N_e$ are for the green mercury e line of the spectrum at a wavelength $\lambda_e$ of 5461 Å.

All of the illustrated examples of zoom lenses contain two optical units, specified as $U_1$ and $U_2$ in the drawings. Subunits $U_{1A}$ and $U_{1B}$ make up the first or front optical unit $U_1$. As used herein the terms "front" and "rear" refer respectively to the object side and image side. In the embodiment shown in FIGS. 1 through 4, optical subunits $U_{1A}$ and $U_{1B}$ move together during zooming, and the space between these two optical units does not vary for zooming. These embodiments thus have the substantial advantage of requiring a relatively simple zooming mechanism. However, in the broader aspects of the invention, the air space between the optical subunits $U_{1A}$ and $U_{1B}$ may be made to vary during zooming.

Optical subunit $U_{1A}$ in each example is a weak single-element lens which may or may not have aspheric surfaces. By "weak" it is meant that the power of a first subunit $U_{1A}$ is smaller than the power of the first optical unit $U_1$ so that absolute value of the ratio of power $K_{1A}$ of the first optical subunit $U_{1A}$ to the power $K_1$ of the optical unit $U_1$ is about 0.5 or less, or $$\left| \frac{K_{1A}}{K_1} \right| < 0.5.$$

In all examples, the power of optical unit $U_{1A}$ is between 0.2 and 0.9 of the power $K_w$ of the entire lens units wide angle position. In Examples 1, 2 and 4, this element is slightly negative in power. In Example 3 it is slightly positive in power. The optical subunit $U_{1B}$ is always positive in power. It contains one or more lens elements. In Example 1, it is a single lens element. In Examples 2-4, it contains two lens elements, one with a positive and one with a negative power. In Example 2, it contains two slightly air-spaced elements. In Example 4, it is a cemented doublet. In Example 3, the air space between two lens elements is relatively large.

The second lens unit $U_2$ is negative in all examples. It consists of only one, single negative power biconcave lens element. This lens element has a stronger surface facing the front and the weaker surface oriented toward the rear.

The aperture stop is located between the first and second optical subunits, $U_{1A}$ and $U_{1B}$ respectively.

Note that all of the examples are corrected across a zoom range of 2 with an effective aperture that varies from approximately f/8 to f/11. This range of apertures for a 3 or 4 element zoom lens suitable as an objective or taking lens for a 35mm camera is quite remarkable.

TABLE 1
EXAMPLE 1

| SURFACE | CLEAR APER. | RADIUS | THICKNESS | MATERIAL |
|---|---|---|---|---|
| 1 | 6.12 | −173.69 | 1.40 | 590309 |
| 2 | 4.90 | ASPHERE | 1.30 | |
| | 4.62 | DIAPHRAGM | 2.12 | |
| 3 | 6.70 | 60.11 | 3.60 | 492574 |
| 4 | 8.59 | ASPHERE | A | |
| 5 | 15.56 | ASPHERE | 2.00 | 535405 |
| 6 | 21.57 | 1,334.15 | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

SURFACE 2: $C = 0.043$, $k = 0.0$
$D = 0.654E-03$, $E = -0.878E-04$, $F = 0.447E-04$, $G = -0.843E-05$, $H = 0.574E-06$, $I = 0.0$

SURFACE 4: $C = -0.140$, $k = -0.989$
$D = -0.104E-03$, $E = -0.691E-04$, $F = 0.116E-04$, $G = -0.105E-05$, $H = 0.468E-07$, $I = -0.806E-09$

SURFACE 5: $C = -0.094$, $k = -0.705$
$D = -0.297E-04$, $E = -0.343E-05$, $F = 0.125E-06$, $G = -0.307E-08$, $H = 0.398E-10$, $I = -0.222E-12$

| SURFACES | EF | BF | FF |
|---|---|---|---|
| 1–4 | 16.83 | 19.39 | 8.75 |
| 5–6 | −19.48 | −20.77 | −19.49 |

$\left|\frac{K_{1A}}{K_w}\right| = .76$ and $\left|\frac{K_{1A}}{K_1}\right| = .49$

| EF | A | REL. APER. |
|---|---|---|
| 49.61 | 6.51 | 11.24 |
| 34.63 | 9.37 | 9.40 |
| 26.05 | 12.49 | 8.20 |

TABLE 2
EXAMPLE 2

| SURFACE | CLEAR APER. | RADIUS | THICKNESS | MATERIAL |
|---|---|---|---|---|
| 1 | 5.54 | −13.45 | 1.23 | 722293 |
| 2 | 5.25 | −19.27 | 1.00 | |
| | 4.68 | DIAPHRAGM | 1.01 | |
| 3 | 4.89 | 17.25 | 4.29 | 762270 |
| 4 | 7.50 | 13.18 | 0.37 | |
| 5 | 8.49 | 17.12 | 5.91 | 623581 |
| 6 | 11.50 | −12.86 | A | |
| 7 | 16.00 | −10.27 | 1.50 | 517642 |
| 8 | 22.16 | 356.34 | | |

| SURFACES | EF | BF | FF |
|---|---|---|---|
| 1–6 | 17.24 | 16.49 | 9.05 |
| 7–8 | −19.23 | −20.18 | −19.25 |

$\left|\frac{K_{1A}}{K_w}\right| = .39$ and $\left|\frac{K_{1A}}{K_1}\right| = .26$

| EF | A | REL. APER. |
|---|---|---|
| 49.73 | 3.90 | 11.24 |
| 34.64 | 6.80 | 9.40 |
| 26.01 | 9.98 | 8.20 |

TABLE 3
EXAMPLE 3

| SURFACE | CLEAR APER. | RADIUS | THICKNESS | MATERIAL |
|---|---|---|---|---|
| 1 | 6.00 | 10.73 | 1.50 | 589613 |
| 2 | 5.03 | 16.62 | 1.36 | |
| | 4.04 | DIAPHRAGM | 0.93 | |
| 3 | 3.96 | −68.99 | 1.73 | 548458 |
| 4 | 5.93 | 19.86 | 1.14 | |
| 5 | 9.47 | 31.71 | 7.00 | 772497 |
| 6 | 13.17 | −12.07 | A | |
| 7 | 14.99 | −9.91 | 2.48 | 575415 |
| 8 | 21.01 | 1,000.00 | | |

| SURFACES | EF | BF | FF |
|---|---|---|---|
| 1–5 | 15.10 | 12.82 | 6.07 |
| 6–7 | −16.95 | −18.51 | −29.29 |

$\left|\frac{K_{1A}}{K_w}\right| = .56$ and $\left|\frac{K_{1A}}{K_1}\right| = .32$

| EF | A | REL. APER. |
|---|---|---|
| 49.18 | 1.06 | 11.24 |
| 34.64 | 3.25 | 9.40 |
| 26.06 | 5.68 | 8.20 |

TABLE 4
EXAMPLE 4

| SURFACE | CLEAR APER. | RADIUS | THICKNESS | MATERIAL |
|---|---|---|---|---|
| 1 | 5.50 | −13.61 | 1.09 | 613586 |
| 2 | 5.20 | −27.11 | 1.00 | |
| | 4.69 | DIAPHRAGM | 1.01 | |
| 3 | 5.88 | 17.08 | 2.14 | 805254 |
| 4 | 6.75 | 7.54 | 8.00 | 652449 |
| 5 | 11.13 | −13.14 | A | |
| 6 | 16.16 | −10.25 | 1.50 | 517642 |
| 7 | 22.63 | 298.46 | | |

| SURFACES | EF | BF | FF |
|---|---|---|---|
| 1–5 | 17.33 | 17.38 | −9.12 |
| 6–7 | −19.08 | −20.03 | −19.11 |

$\left|\frac{K_{1A}}{K_w}\right| = .57$ and $\left|\frac{K_{1A}}{K_1}\right| = .38$

| EF | A | REL. APER. |
|---|---|---|
| 49.85 | 4.90 | 11.24 |
| 34.64 | 7.82 | 9.55 |
| 25.99 | 10.99 | 8.20 |

What is claimed is:

1. A compact zoom lens comprising:
   a first lens unit of positive refractive power including a front subunit consisting entirely of a single component having a weak negative refractive power, a second rear positive power subunit, said second subunit including at least one lens element having positive refractive power and at least one lens element having negative refractive power, and an aperture stop located between said first and second subunits; and
   a second lens unit arranged on the image side of said first lens unit, and consisting of a negative refractive power bi-concave lens element, wherein zooming is performed by varying the axial separation between said first lens unit and said second lens unit.

2. A compact zoom lens according to claim 1, wherein said positive lens element of said second subunit and the negative power lens element of said second subunit are uncemented.

3. A compact zoom lens according to claim 1, wherein said second subunit includes a cemented doublet lens component, said doublet lens component consisting of a negative refractive power lens element cemented to a positive refractive power lens element.

4. A compact zoom lens according to claim 1, wherein said second subunit consists of a negative refractive power lens element cemented to a positive refractive power lens element.

5. A compact zoom lens according to claim 1, wherein said biconcave element has a strongly concave surface oriented towards the front and a weaker surface oriented towards the rear.

* * * * *